United States Patent [19]

McNutt

[11] 4,326,827
[45] Apr. 27, 1982

[54] HAY BALE HANDLING APPARATUS

[76] Inventor: Darrell A. McNutt, Highway 70 East, Soper, Okla. 74759

[21] Appl. No.: 172,156

[22] Filed: Jul. 25, 1980

[51] Int. Cl.³ .............................................. B60P 1/08
[52] U.S. Cl. .................................. 414/24.5; 414/436; 414/485; 294/105
[58] Field of Search ............... 294/105, 106, 107, 108, 294/109, 61, 88, 120; 414/24.5, 24.6, 437, 469, 684, 721, 910, 911, 436, 485

[56] References Cited

U.S. PATENT DOCUMENTS 3,938,682 2/1976 Rowe .................................. 414/24.5
4,084,711 4/1978 Armstrong ......................... 414/24.5
4,089,425 5/1978 Baltz .................................. 414/24.5

Primary Examiner—James B. Marbert
Attorney, Agent, or Firm—Head & Johnson

[57] ABSTRACT

An apparatus for retrieving and carrying large cylindrical objects and adapted to be secured behind a towing vehicle, the apparatus comprising an A-frame having a wheel supported cradle assembly pivotally secured to one end thereof, a pivotal bail member provided on the cradle assembly, the cradle assembly being movable to a first position for an initial engagement with the lower portion of the cylindrical object and to a second position whereby gravity acts on the bail member for moving the bail into engagement with the outer periphery of the object and a third position for elevating the object into a carrying position whereby the object may be transported from site to site by the apparatus, and the movement of the cradle assembly being reversed for discharging the object from the apparatus.

8 Claims, 7 Drawing Figures

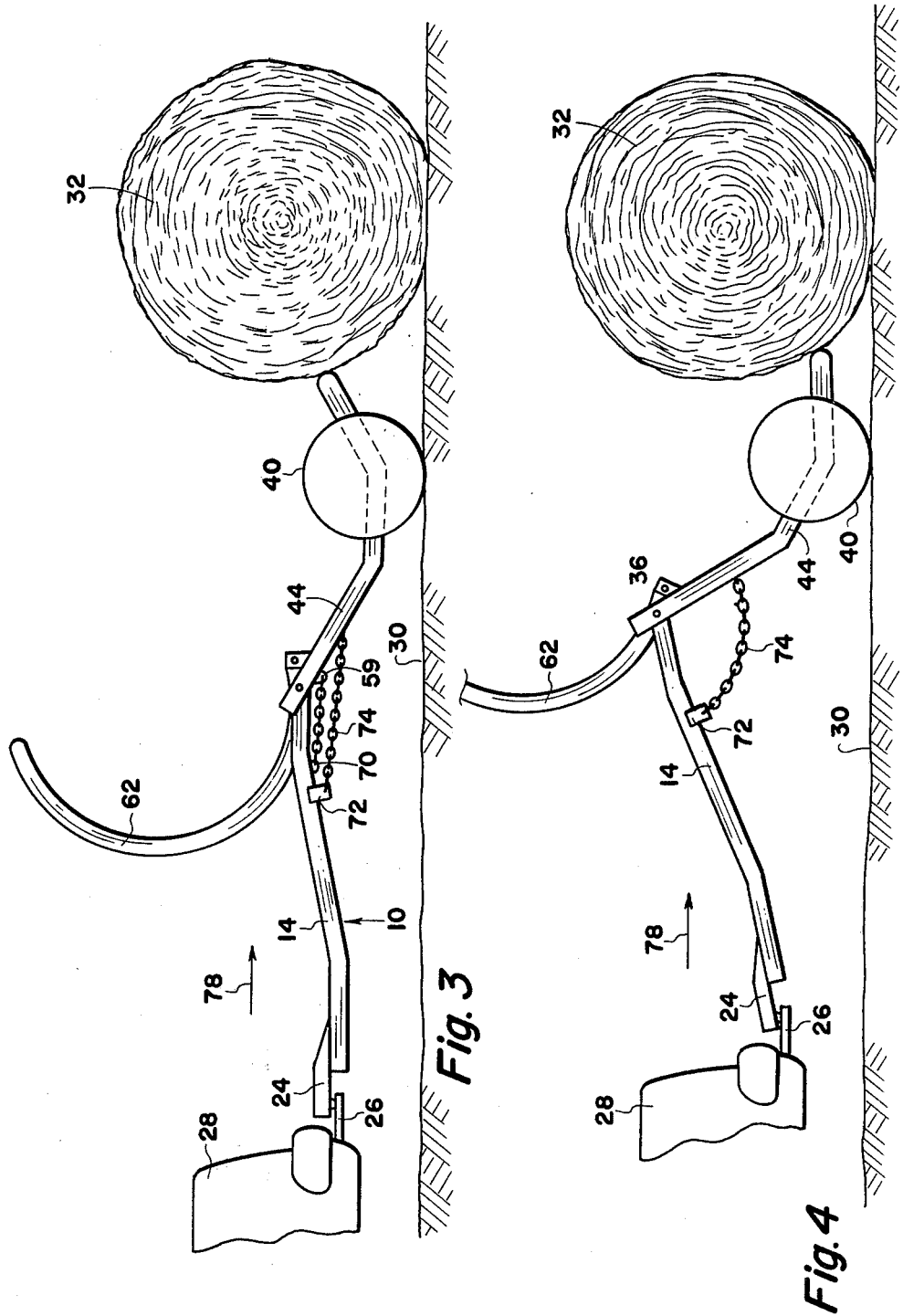

HAY BALE HANDLING APPARATUS

BACKGROUND OF THE INVENTION

1. Field of the Invention

This invention relates to improvements in apparatus for retrieving and transporting large objects and more particularly, but not by way of limitation, to apparatus for retrieving and transporting large cylindrical bales of hay, or the like.

2. Description of the Prior Art

In recent years it has become common place to bind bales of hay in circular or cylindrical bales through the use of automated hay baling equipment. These cylindrical or circular hay bales are normally left in the field by the baling equipment and must be picked up or retrieved as sometime subsequent to the baling operation for movement to the desired storage site. The bales are usually relatively large, as for example five to six feet in diameter and five to six feet in length, and are quite heavy, weighing approximately 800 pounds each. As a result the bales are very difficult to handle. In order to facilitate the retrieval of the baled hay from the fields, frame devices have been developed for attachment behind a towing vehicle and adapted to engage and elevate the cylindrical bales onto the apparatus whereby the towing vehicle may pull the apparatus and hay bale loaded thereon to the place of storage or use. Examples of such hay bale carrier are shown in the Carroll Grant Row U.S. Pat. No. 3,938,682, issued Feb. 16, 1976, and entitled "Self-Loading Hay Hauler"; Kannady et al U.S. Pat. No. 3,985,253, issued Oct. 12, 1976, and entitled "Large Hay Bale Carrier"; and the Harold D. Baltz U.S. Pat. No. 4,089,425, issued May 16, 1978, and entitled "Self-Loading Trialer". These devices have certain disadvantages, however, in that the bail member for facilitating loading of the hay bale onto the carrier is either inefficient or ineffective, and in many instances mutilates or damages a portion of the hay bale during the loading operation.

Furthermore, many of the bales of hay are tied or bound with twine, or the like, to maintain a substantially compact configuration for the bale during periods of storage for future use of the hay for the feeding of livestock, and the like. After a period of time in storage, the twine frequently deteriorates and the hay bale is not bound in its original compact circular configuration. Other bales are not tied with twine or otherwise bound in any manner, and needless to say, these bales are also relatively loosely contained subsequent to periods of storage. Thus, when the present day hay bale handling equipment is utilized for the retrieval of a hay bale from storage for use during a feeding operation, the bail member is extremely inefficient in handling of the loose hay bale and usually inflicts considerable damage to the bale. This frequently reduces the quantity of hay which may be actually used in the feeding operation, since much of the bale is destroyed and hay is lost therefrom.

One of the advantages of the circular hay bales is that this particular configuration permits storage of the bales in the out-of-doors, and of course, it is advantageous to place the bales in substantial longitudinal alignment, and positioned as close together as practical, leaving only a relatively small "crack" therebetween for permitting the flow of water around the outer periphery of the bale during rainstorms, and the like. This close proximity of the hay bales to one another creates still another problem for the bail members of the present day hay bale handling equipment in that as the bail member is moved into a position for encasing or surrounding the outer periphery of the hay bale during a retrieval operation, the outer end of the bale frequently strikes an adjacent hay bale, creating damage thereto, and it is difficult to actually "insert" the outer end of the bail member between the bales for an efficient retrieval of a single base.

SUMMARY OF THE INVENTION

The present invention contemplates a novel hay bale handling apparatus which has been particularly designed and constructed for overcoming the foregoing disadvantages. The novel apparatus comprises an A-frame having hitch means provided at one end thereof for connection with a suitable towing vehicle, such as a farm tractor, pick-up truck, or the like, and a wheel supported cradle assembly pivotally secured at the opposite end thereof. The cradle assembly comprises a pair of spaced mutually parallel arm members of a general cradle-like longitudinal configuration for supporting the hay bale therebetween during loading and transporting thereof. In addition, a spring urged arcuate arm or bail member is pivotally secured between the arm members for alternate engagement and disengagement with the hay bale during loading of the bale onto the cradle assembly. The cradle assembly is pivotal about both the connection with the A-frame and the wheel axle to a first position of engagement with the outer periphery of the hay bale in the proximity of the lowermost portion thereof as the bale is resting on the ground, and to a second position whereby gravity acts on the bail for dropping the bail into an encircling engagement with the outer periphery of the hay bail for cooperating with the arm members to grasp the bale during elevation thereof to a transporting or carrying position on the cradle assembly. When the bale has been engaged by the arms and bail member, the cradle assembly may be rocked into a transporting position for elevating the hay bale from the field and whereby the bale is rolled onto the cradle assembly for transporting to another location. As the bale reaches the carrying position on the cradle assembly, the spring and bail member is moved in a controlled manner to a position away from the bale for precluding interference with the transporting thereof. During transporting of the hay bale on the cradle the bail member is suspended in the out of engagement position, and held by spring tension during any jarring as the cradle is pulled across rough terrain, thus precluding "banging" of the bail member against the cradle structural elements for reducing damage to the bail member. Of course, when the bale is to be unloaded from the cradle assembly, the cradle may be pivoted about the connection with the A-frame and wheel axle for reversing the loading operation and gently or easily releasing the hay bale onto the ground or floor at the storage site or place of ultimate usage. The novel hay bale handler or carrier is simple and efficient in operation and economical and durable in construction.

BRIEF DESCRIPTION OF THE DRAWINGS

FIG. 3 is a side elevational view of a hay bale handling apparatus embodying the invention and illustrated in an initial position for initiating the retrieval of a hay bale.

FIG. 4 is a view similar to FIG. 3 illustrating a second step in the retrieval of a hay bale.

DETAILED DESCRIPTION OF THE PREFERRED EMBODIMENT

Figure 1:
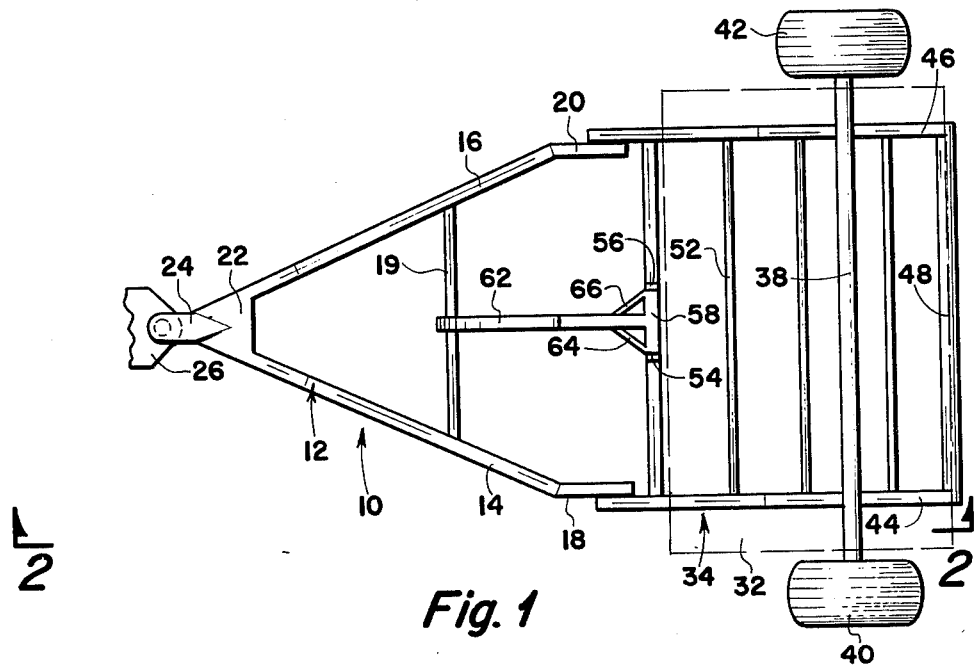
FIG. 1 is a plan view of a hay bale handling apparatus embodying the invention and illustrates a transporting position for a hay bale, with the hay bale being shown in broken lines.

Referring to the drawings in detail, reference character 10 generally indicates a hay bale handling apparatus comprising a substantially A-shaped frame 12 having oppositely disposed outwardly diverging leg member 14 and 16 having a cross bar 17 secured therebetween, and terminating at one end in spaced mutually parallel frame members 18 and 20, respectively. The opposite end of the arms 14 and 16 are secured together in any suitable manner, such as by a substantially triangular gusset plate 22 having a suitable hitch socket member 24 secured thereto. The hitch socket member 24 is of any suitable or well known type for pivotal connection with the usual ball hitch means 26 provided on the rear portion of a suitable towing vehicle 28. The vehicle 28 may be any suitable type, such as the usual farm tractor, pick-up truck, or the like, and is utilized for manipulation of the apparatus 10 across the surface of the ground 30 or along a roadway (not shown) during retrieval and transporting of a cylindrical object 32, which as shown herein may be a hay bale.

A cradle assembly generally indicated at 34 is pivotally secured to the frame members 18 and 20 in any suitable manner, such as by pivot pins 36, and is pivotally supported by an axle 38 having suitable support wheels 40 and 42 journalled at the opposite ends thereof. The cradle assembly 34 is thus pivotal about both the pivot axis established by the pivot pins 36 and the axis of the axle 38 for a purpose and in a manner as will be hereinafter set forth.

The cradle assembly 34 comprises a pair of spaced mutually parallel arm members 44 and 46 having an angular longitudinal configuration generally corresponding to the transverse configuration of the outer periphery of the hay bale 32 for cradling or supporting the bale 32 therebetween. The outer ends of the arms 44 and 46 are preferably secured in spaced relation by a suitable cross bar 48, and a similar cross bar 50 is welded or otherwise secured between the arms 44 and 46 in the proximity of the inner ends thereof, but spaced outboard of the pivot pins 36. In addition, a plurality of spaced intermediate cross bars 52 are preferably welded or otherwise secured between the arms 44 and 46 for reinforcing thereof and for cooperating therewith for supporting the hay bale on the assembly 34.

Figure 7:
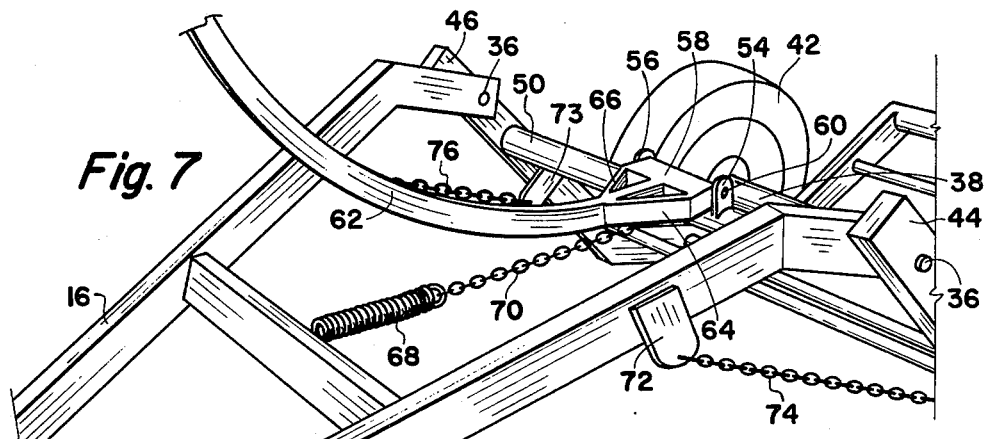
FIG. 7 is a perspective view of a portion of a hay bale handling apparatus embodying the invention.

A pair of spaced radially outwardly extending flanges 54 and 56 are rigidly secured to the outer periphery of the cross bar 50 and are preferably substantially centrally disposed between the arms 44 and 46 as particularly shown in FIGS. 1 and 7. A block member 58 is pivotally secured between the flanges 54 and 56 in any suitable manner, such as pivot pins 60, and is preferably provided with an outwardly extending flange 59 (FIG. 6) which engages the outer periphery of the bar 50 for limiting the rotation of the block 58 in one direction for a purpose as will be hereinafter set forth. An arcuate bail member 62 is welded or otherwise secured to the outer periphery of the block 58 and extends outwardly therefrom. It is preferable to provide a pair of angularly extending brace members 64 and 66 welded or otherwise secured between the block 58 and the opposite sides of the bail member 62 for strengthening of the bail, as is well known. In addition, a suitable helical spring means 68 has one end anchored on the cross member 19 of the A-frame 12, and a chain means 70, or the like, secured to the opposite end thereof. The chain 70 is also secured to the flange member 59 of the block 58 for a purpose as will be hereinafter set forth. Furthermore, bracket members 72 (only one of which is shown in the drawings) may be secured to the outboard sides of each arm 14 and 16 and a similar bracket means 73 may be provided on the inboard side of each arm 44 and 46. Chain means 74 is suitably secured between bracket 72 of the arm 14 and brackets 73 of the arm 44, and a similar chain means 76 is secured between the bracket 72 of the arms 16 and bracket 73 of the arm 46 for limiting the rotation of the cradle assembly 34 about the pivot pins 36 in one direction, as will be hereinafter set forth.

It is preferable to provide suitable braking means (not shown) for the wheels 40 and 42 for limiting the movement thereof during loading and unloading of the bale 32 onto the cradle assembly 34, as will be hereinafter set forth. Alternately, suitable block means or chocks (not shown) may be positioned against the outer periphery of the wheels 40 and 42 for limiting movement thereof when required, and as will be hereinafter set forth.

Figure 5:
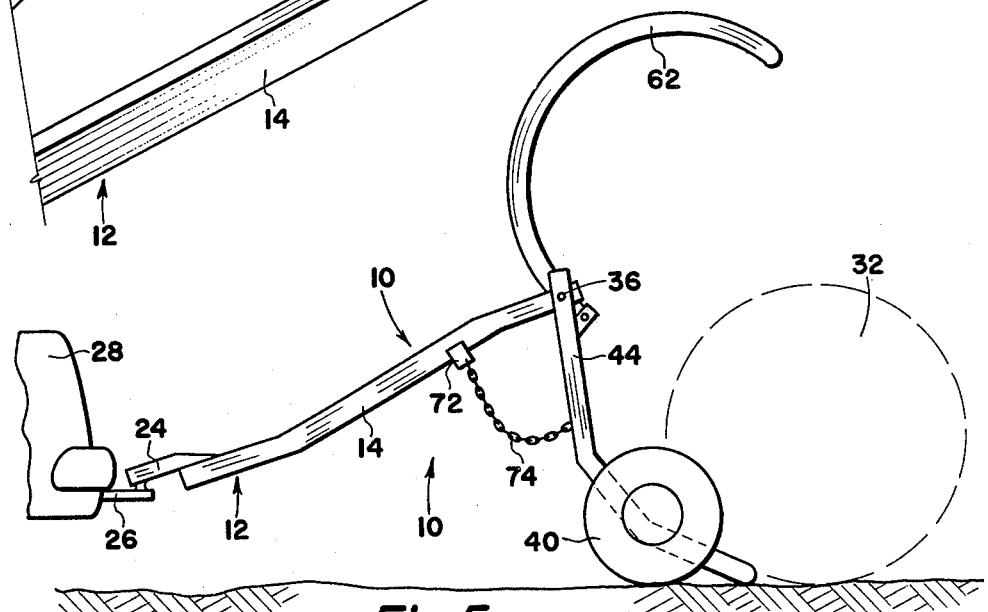
FIG. 5 is a view similar to FIGS. 3 and 4 illustrating a further step in the retrieval of a hay bale, with the hay bale being depicted in broken lines for purposes of illustration.

Referring now to FIGS. 3, 4 and 5, sequential steps are shown for using the apparatus 10 to retrieve the hay bale 32 which is positioned on the surface of the ground 30. Initially, the towing vehicle 28 is manuevered in the usual manner into a position on the surface of the ground whereby a reverse direction of movement of the vehicle 28 in the direction indicated by the arrow 78 will move the apparatus 10 into a position of orientation with respect to the bale 32 whereby the cross bar 48 of the cradle assembly 34 is in abuttment with the outer periphery of the bale 32, as particularly shown in FIG. 3. At this time, the braking means for the wheels 40 and 42 may be engaged for limiting any further rolling action or movement of the wheels. Alternately, of course, suitable blocks or chocks (not shown) may be wedged against the outboard periphery of the wheels for limiting any further movement thereof in the direction toward the bale 32.

Since the wheels 40 and 42 are braked against further rearward movement, a continued reverse direction of movement for the vehicle 28 in the direction indicated by the arrow 78 will cause the A-frame 12 and cradle assembly 34 to pivot about the pivot pins 36, and the cradle assembly 34 to pivot about the axis of the axle 38 as shown in FIG. 4. This moves the cross bar 48 downwardly around the outer periphery of the bale 32 until the cross bar 48 is disposed substantially beneath the bale, as shown in FIG. 5. A continued reverse movement of the vehicle 28 in the direction of the arrow 78 will further pivot the cradle assembly 34 about the axis of the axle 38, and the A-frame and cradle assembly about the axis of the pins 36 until the cross bar 48 and/or outer ends of the arms 44 and 46 engage the surface of the ground 30, and since the chains 74 and 76 limit the pivotal movement of the cradle assembly 34 in this direction the wheels 40 and 42 will be lifted from the surface of the ground, and shown in FIG. 6 whereby the cradle assembly 34 then pivots about the axis of the cross bar 48. In addition, the pivot pins 36 will be moved sufficiently outboard or forward of the cross bar 48 or axle 38 whereby the spring 68 is in a relaxed position and gravity acts on the bail member 62 whereby the bail falls over the outer periphery of the bale 32, as particularly shown in FIG. 6.

Figure 2:
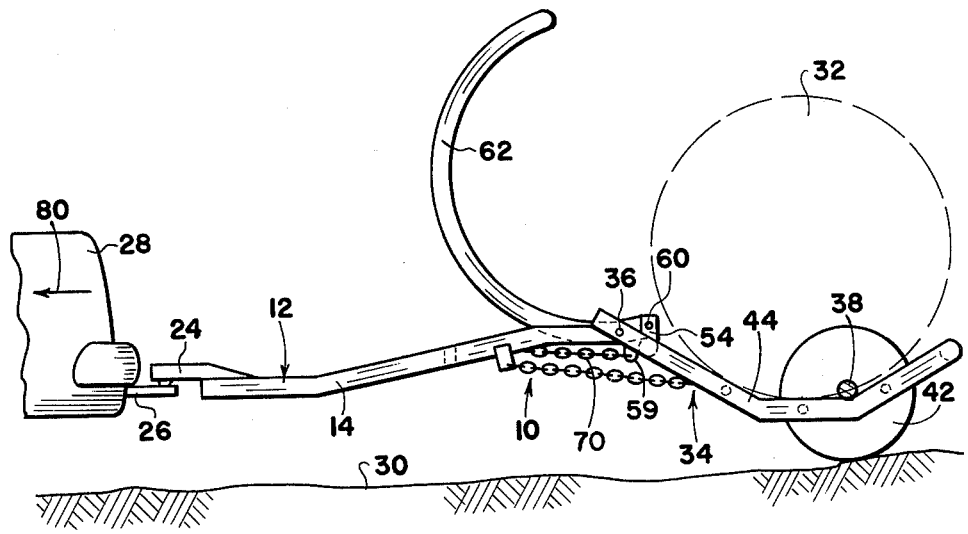
FIG. 2 is a view taken on line 2—2 of FIG. 1.
Figure 6:
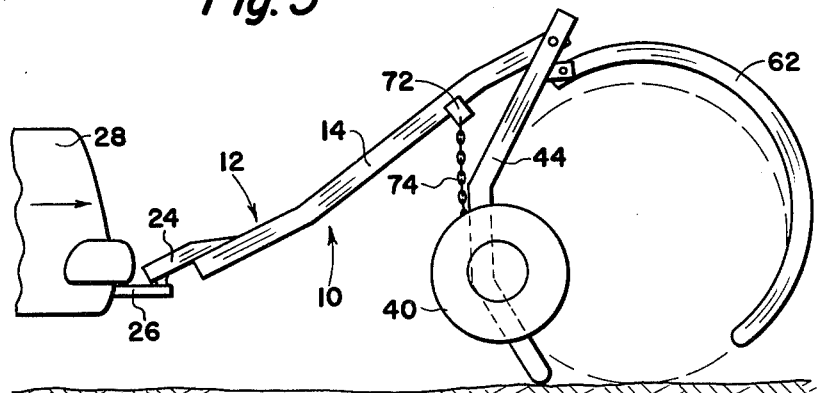
FIG. 6 is a view similar to FIG. 5 illustrating a still further step in the retrieval of a hay bale.

In this position as shown in FIG. 6, it will be apparent that the bale 32 is firmly engaged by the cradle 34 and the bail 62, and a forward movement of the vehicle 28 as indicated by the arrow 80 (FIG. 2) will return the wheels 40 and 42 into engagement with the surface of the ground 30 and pivot the cradle assembly 34 toward the normal upright position thereof. During this movement, the bale 32 will be carried into a cradled or supported position between the arms 44 and 46, as particularly shown in FIG. 2, and when the bale 32 is thus loaded onto the cradle assembly 34, the spring means 68 will be in tension whereby chain means 70 will return the bail member 62 to the normal upwardly extending position therefor, out of engagement with the bale 32. The relative position of the pivot axes determined by the pins 36 (axis no. 1), pins 60 (axis no. 2) and connection point 59 (axis no. 3) are particularly selected whereby the tension of the spring 68 is relaxed when the bail member 62 is in a position for falling by gravity over the outer periphery of the bale 32 during retrieval thereof, and is in tension as the cradle 34 moves back toward the transporting position. The spring 68 thus firmly suspends the bail 62 in the upwardly extending position thereof and precludes engagement of the bail with the cross bar 19 during travel of the apparatus 10 across rough terrain or the like, during transporting of the hay bale 32. It is to be noted that the overall configuration of the bail member 62 is substantially circular conforming to the transverse configuration of the outer periphery of the bale 32, and is of a sufficiently great arc length as to encompass more than half the circumference of the bale 32, thus assuring an efficient engagement of the bale during the retrieving of the bale for a loading (and unloading) operation without the need of penetration of any portion of the bale 32 itself. Thus, as the bail is dropped around the bale in a loading operation the bail will fall easily between a pair of adjacent bales without damage or injury to either bale, also, as the bail is removed from engagement with the bale 32, there can be no damage to the baled material whether the bales are tied or in a loosened or unrestricted condition.

The vehicle 28 may now be driven in the forward direction indicated by the arrow 80 for delivery of the bale 32 to the desired destination therefor, whereupon the operation of the apparatus 10 may be repeated for unloading of the bale 32. Since the position of the axis of point 59 (axis no. 3) is particularly related to the axes 1 and 2 as hereinbefore set forth, the spring 68 is in tension and holds the bail 62 in the upright position and precludes engagement of the bail with the cross bar 19 during transporting of the bale 32. This greatly prolongs the useful life of the bail 62.

From the foregoing it will be apparent that the present invention provides a novel hay bale handling apparatus which may be easily engaged with a large and heavy hay bale for readily retrieving the bale in a manner substantially eliminating any damage to the bale, and in a manner permitting quick and facile retrieving of the bale for movement to a place of storage, or the like. The novel apparatus comprises bail means particularly designed for cooperating with a cradle assembly for handling of the bale in an expeditious manner without damage to the bale.

Whereas the present invention has been described in particular relation to the drawings attached hereto, it should be understood that other and further modifications, apart from those shown or suggested herein may be made within the spirit and scope of this invention.

What is claimed is:

1. Apparatus for handling cylindrical objects and adapted to be secured to a towing vehicle, said apparatus comprising A-frame means having hitch means provided at one end thereof for connection with the vehicle, wheel supported cradle means pivotally secured to the opposite end of the A-frame means for retrieving and carrying said cylindrical object thereon, means secured between the A-frame means and cradle means for limiting the movement of the cradle means in one direction, bail means pivotally secured to the cradle means and freely movable in one direction for engaging the outer periphery of the object during retrieval thereof, said bail means being of an arcuate configuration of a size at least slightly greater than half the outer circumference of the object whereby the bail encircles the object throughout more than half the circumference thereof, and spring means secured between the A-frame means and bail means for urging the bail in a direction away from engagement with the object and precluding engagement of the bail means with the A-frame means during carrying of the object for transporting thereof.

2. Apparatus for handling cylindrical objects as set forth in claim 1 wherein the object is a hay bale.

3. Apparatus for handling cylindrical objects as set forth in claim 2 wherein the configuration of the bail means provides for efficient retrieving of the hay bale and release thereof for transporting without penetration of the hay bale to reduce damage thereto.

4. Apparatus for handling cylindrical objects as set forth in claim 1 wherein the cradle means comprises a pair of spaced mutually parallel arms of a longitudinal configuration generally corresponding to a cradle, cross bar means secured between the outer ends of said arms, the opposite ends of said arms being pivotally secured directly to the A-frame means for pivotal movement with respect to the A-frame means, an axle extending transversely between and beyond the arms and pivotally secured thereto whereby the cradle means is pivotal about both the pivotal connection with the A-frame means and the axle, wheel members journalled at the opposite ends of the axle to provide said wheel support for the cradle means.

5. Apparatus for handling cylindrical objects as set forth in claim 4 and including cross bar means secured between the arms spaced slightly inboard of the pivot connection thereof with the A-frame means, and means provided on said last mentioned cross bar means for pivotally securing the bail means thereto.

6. Apparatus for handling cylindrical objects as set forth in claim 5 wherein the pivotal means provided on the cross bar means includes flange means engagable with the cross bar means for limiting the movement of the bail means in one direction.

7. Apparatus for handling cylindrical objects as set forth in claim 6 wherein the means for urging the bail means in a direction away from said hay bale includes spring and chain means secured between the A-frame means and the flange means, the connection point of the chain means being positioned relative to the position of the pivot condition of the cradle means and pivot connection of the bail means whereby the spring is in a relaxed position during engagement of the bail means with the object and in tension during disengagement of the bail means from the object to maintain the bail means out of engagement with the A-frame means when the object is loaded in the cradle means.

8. Apparatus for handling cylindrical objects as set forth in claim 1 wherein the means secured between the A-frame means and cradle means for limiting movement of the cradle means in one direction includes chain means secured between the A-frame means and cradle means.

* * * * *